United States Patent [19]

Hays et al.

[11] Patent Number: 4,648,907

[45] Date of Patent: Mar. 10, 1987

[54] HIGH COLOR STRENGTH DIARYLIDE YELLOW PIGMENT COMPOSITIONS

[75] Inventors: Byron G. Hays, Verona; Robert J. Stanaback, Gladstone, both of N.J.

[73] Assignee: BASF Corporation, Clifton, N.J.

[21] Appl. No.: 722,976

[22] Filed: Apr. 12, 1985

[51] Int. Cl.[4] .............................................. C09D 11/08
[52] U.S. Cl. ........................................ 106/30; 106/31; 106/288 Q; 106/309
[58] Field of Search ................ 106/30, 31, 288 Q, 309

[56] References Cited

U.S. PATENT DOCUMENTS

| | | | |
|---|---|---|---|
| 3,725,101 | 4/1973 | Kubne | 106/288 |
| 3,775,148 | 11/1973 | Bradley | 106/288 |
| 3,776,749 | 12/1973 | McKay et al. | 106/288 |
| 4,154,618 | 5/1979 | Burke | 106/30 |
| 4,304,601 | 12/1981 | Sharp | 106/30 |
| 4,341,701 | 7/1982 | Pechey et al. | 260/161 |
| 4,469,515 | 9/1984 | Pechey et al. | 106/23 |

OTHER PUBLICATIONS

"Surface Treatment of Organic Pigments for Printing Ink Applications", by B. G. Hays, American Ink Maker, vol. 62, No. 6 (Jun. 1984) pp. 28-50.

*Primary Examiner*—Amelia B. Yarbrough
*Attorney, Agent, or Firm*—Emil Richard Skula

[57] ABSTRACT

Improved diarylide yellow pigment compositions having high color strength. The compositions are manufactured by modifying tetrazotized 3,3'-dichlorobenzidine with a solution of about 3 to about 5 mole percent of a first acetoacetarylide, followed by coupling into a second acetoacetarylide such as acetoacetanilide.

6 Claims, No Drawings

HIGH COLOR STRENGTH DIARYLIDE YELLOW PIGMENT COMPOSITIONS

DESCRIPTION

1. Technical Field

The field of art to which this invention pertains is organic pigments, specifically diarylide yellow pigment compositions.

2. Background Art

Diarylide yellow pigments are well known organic pigments and are commonly used in various types of printing inks. These pigments generally demonstrate good color strength, good transparency, adequate resistance to thermal degradation, and good light fastness. The diarylide yellow pigments are disazo pigments which are manufactured by tetrazotizing 3,3'-dichlorobenzidine to form the tetrazo salt. This tetrazo salt is then coupled with an acetoacetarylide to form the diarylide pigment. Depending on the acetoacetarylide which is coupled into the 3,3'-dichlorobenzidine tetrazo salt, pigments are produced having different pigment characteristics such as resistance to bleeding in solvents, resistance to light, resistance to heat, and color brightness.

The diarylide yellow pigments commonly used in the art are classified according to the acetoacetarylide coupling agent. AAA diarylide yellow is the reaction product of 3,3'-dichlorobenzidine tetrazotized and coupled into acetoacetanilide (AAA). AAMX diarylide yellow is the reaction product of 3,3'-dichlorobenzidine tetrazotized and coupled into acetoacet-2,4-xylidide (AAMX). AAOA diarylide yellow is the reaction product of 3,3'-dichlorobenzidine tetrazotized and coupled into acetoacet-o-anisidide (AAOA). AAOT Diarylide yellow is the reaction product of 3,3'-dichlorobenzidine tetrazotized and coupled into acetoacet-o-toluidide (AAOT). HR yellow is the reaction product of 3,3'-dichlorobenzidine tetrazotized and coupled with acetoacet-2,5-dimethoxy-4-chloroanilide.

Diarylide yellow pigments are the primary organic yellow pigments produced in the United States. Of the diarylide yellow pigments, AAA diarylide yellow, also known as Pigment Yellow 12, is the primary pigment manufactured and used.

The initial step in the manufacture of diarylide yellow pigments is the tetrazotization of 3,3'-dichlorobenzidine. This is accomplished by reacting the 3,3'-dichlorobenzidine with hydrochloric acid and sodium nitrite to produce the tetrazonium salt, 3,3'-dichlorobenzidine tetrazonium chloride.

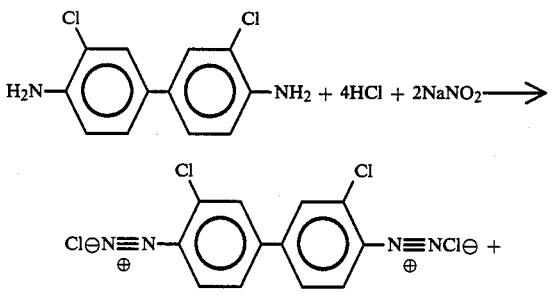

The next step is the coupling of the tetrazonium salt with the acetoacetarylide; in the case of AAA diarylide yellow, this would be acetoacetanilide. The resulting reaction product of this coupling (i.e., the coupling product) is the AAA diarylide yellow pigment.

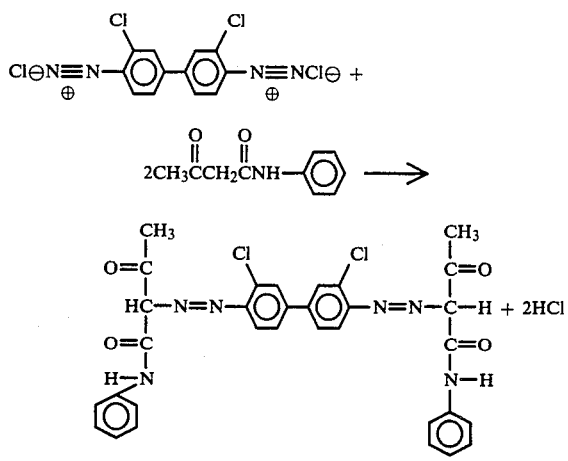

The coupled diarylide yellow pigment must be recovered from a water-based pigment slurry when the reaction has been completed. This is typically done by the use of some sort of pressurized filtration device such as a filter press to form a presscake. Typically the presscake comprises about 20% by weight of pigment and 80% by weight of water. Usually, this presscake is dried in an oven, etc., to reduce the water content and dry out the pigment. The dried pigment is then incorporated into various types of printing ink vehicles.

It is known in the art to treat diarylide yellow pigments with various compositions in order to improve the pigment characteristics. A general disclosure is contained in "Surface Treatment of Organic Pigments for Printing Inks," by B. G. Hays, in "American Ink Maker," Vol. 62, No. 6 (June, 1984), pp 28–50) which is incorporated by reference.

U.S. Pat. Nos. 3,775,148 and 3,776,749 disclose improved diarylide yellow pigment compositions made by adding one or more soluble dye stuffs to the tetrazotized pigment prior to coupling, during coupling, or after coupling. The pigments have improved strength and transparency.

U.S. Pat. Nos. 4,341,701 and 4,469,515 disclose methods of producing improved disazo pigments by a modified coupling technique. The pigments have improved strength and transparency. The process relates to preparing a solution of a diazonium and/or tetrazonium salt of an aromatic or heterocyclic amine; to this solution is added either sodium acetate to raise the pH to 4.0 or a nonionic surfactant, followed by a suspension containing 0.1–50% by weight of the theoretically required total weight of one or more coupling components. This solution is then added to the other coupling components and the coupling reaction is completed.

The disadvantages of the present methods and compositions include: adding soluble dyestuffs decreases the dispersibility of the dried pigment; raising the pH of the tetrazonium salt solution to 4.0 increases the probability of forming off-color degradation product; using a nonionic surfactant often gives pigments with residual surfactant which interferes with lithographic printing properties. There is a constant search in this art for improved diarylide yellow pigments having improved color strength and transparency.

Accordingly, what is needed in this art are improved high color strength diarylide yellow pigment compositions and an improved method for making these compositions.

DISCLOSURE OF INVENTION

A method of manufacturing diarylide yellow pigment compositions having high color strength is disclosed. The improved process comprises first tetrazotizing 3,3'-dichlorobenzidine then modifying the tetrazotized 3,3'-dichlorobenzidine with about 3 mole percent to about 5 mole percent of an acetic acid solution of a first acetoacetarylide, and then coupling the modified 3,3'-dichlorobenzidine tetrazonium salt into a second acetoacetarylide.

Another aspect of this invention is a diarylide yellow pigment composition having increased color strength made by the process described above. The compositions have high color strength.

Another aspect of this invention is a printing ink comprising an aliphatic ink oil, rosin-modified resin, wax, antioxidant, and an improved diarylide yellow pigment composition, wherein the pigment composition is manufactured by the process described above.

The improved diarylide yellow pigment compositions of this invention produced by the improved method of this invention have increased color strength over a diarylide yellow pigments produced by conventional methods. The inks of this invention have improved color strength over inks containing untreated diarylide yellow pigment.

The foregoing and other features and advantages of the present invention will become more apparent from the following description.

BEST MODE FOR CARRYING OUT THE INVENTION

The compound 3,3'-dichlorobenzidine is a commonly available intermediate for dyes and pigments. It is a grey to purple crystalline solid which is insoluble in water, but soluble in alcohol and ether. An example of commercially available dichlorobenzidine is 3,3'-Dichlorobenzidine Dihydrochloride manufactured by Upjohn Company, North Haven, Connecticut.

Various types of acetoacetarylides can be used to manufacture the diarylide yellow pigments of the present invention. Since AAA diarylide yellow is the most commonly manufactured pigment, the most common coupling compound is acetoacetanilide. Acetoacetanilide is an intermediate in the manufacture of various dry organic colors. It is a white crystalline solid which is only slightly soluble in water, but is soluble in dilute sodium hydroxide, alcohol, ether, acids, chloroform, and hot benzene. It is prepared by reacting aniline with diketene. It may also be prepared by reacting ethylacetoacetate with aniline, eliminating ethylalcohol. Acetoacetanilide is commercially available from several manufacturers, such as American Hoechst, Coventry, Rhode Island. Although various acetoacetarylides can be used to form the disazo pigments of this invention, it is more common to use particular acetoacetanilides such as the previously mentioned acetoacetanilide (AAA), acetoacet-2,4-xylidide (AAMX), acetoacet-o-anisidide (AAOA), and acetoacet-o-toluidide (AAOT), and acetoacet-2,5-dimethoxy-4-chloranilide. Additional acetoacetarylides which can be used to form diarylide yellow pigments include acetoacet-p-toluidide (AAPT), acetoacet-p-phenetidide (AAPP), etc.

The improved color strength diarylide yellow pigment compositions of this invention are manufactured by initially tetrazotizing 3,3'-dichlorobenzidine, then modifying the tetrazotized 3,3'-dichlorobenzidine with an acetic acid solution of a first azetoacetarylide, and then coupling the modified 3,3'-dichlorobenzidine tetrazonium salt into a second acetoacetarylide. Initially, a sufficient amount of 3,3'-dichlorobenzidine is charged to a conventional reactor vessel having a mixing means along with sufficient quantities of water, ice, hydrochloric acid and sodium nitrite. Preferably, for about 1 mole (253 parts) of 3,3'-dichlorobenzidine as its di-hydrochloride salt are added about 3.30 moles (380 parts) of 31.5% hydrochloric acid, 1770 parts of water, and about 880 parts ice and about 2.03 moles (140 parts) of sodium nitrite. The reactants are mixed for a sufficient amount of time, typically about 45 to about 90 minutes, preferably about 60 minutes, at a sufficient temperature, typically at about 0°–5° C., preferably about 0° C., so that the 3,3'-dichlorobenzidine is completely tetrazotized.

Excess nitrous acid is destroyed by adding sufficient amounts of sulfamic acid, preferably about 0.03 mole (3 parts).

Next, a sufficient quantity of an acetic acid solution of a first acetoacetarylide is added to the tetrazonium salt. The acetic acid solution of the first acetoacetarylide is prepared by stirring the acetoacetarylide with 5–20 times its weight of 80% acetic acid until complete solution is obtained. The 80% acetic acid is commercially available from suppliers such as Brown Chemical Co., Oakland, N.J. Sufficient quantities of the acetic acid solution of the first acetoacetarylide are added to modify the tetrazotized 3,3'-dichlorobenzidine. Typically about 1% to about 10 mole % is added, more typically about 3 mole % to about 7 mole % is added, and preferably about 5 mole %.

Next, the modified tetrazonium salt solution is added to sufficient quantities of a buffered second acetoacetarylide coupling slurry to completely couple the tetrazonium salt and form the diarylide yellow pigment. The buffered second acetoacetarylide coupling slurry is made by mixing acetoacetarylide with water, sodium acetate and acetic acid. Preferably, for each mole of 3,3'-dichlorobenzidine, if 5 mole% (0.10 mole) of the first acetoacetarylide is used, about 1.92 moles of the second acetoacetarylide (e.g., 340 parts of acetoacetanilide) are used, along with about 4.6 moles (380 parts) of sodium acetate, about 1.35 moles (101 parts) of 80% acetic acid, and 7300 parts of water. The reaction is carried out at a sufficient temperature, typically about 15°–30° C., preferably about 20° C., for a sufficient amount of time, typically about 30–90 minutes preferably about 60 minutes, to completely couple out the tetrazonium salt.

The pigment is then formed into a presscake by conventional means known in the art such as pumping into a conventional filter press. The presscake is then dried in an oven until the moisture content is reduced down to levels typical in the art, e.g., less than one wt.% of water.

The following examples are illustrative of the principles and practice of this invention although not limited thereto. Parts and percentages where used are parts and percentages by weight.

EXAMPLE 1

Tetrazotized 3,3'-dichlorobenzidine was prepared by charging 100 parts of 3,3'-dichlorobenzidine as its dihydrochloride salt to a conventional reactor vessel having a suitable mixer. About 700 parts of water, about 150 parts of 31.5% hydrochloric acid, about 350 parts of ice, and about 55.5 parts of sodium nitrite were also charged to the reactor vessel. The reactants were maintained under agitation at a temperature of about 0°-5° C. until the 3,3'-dichlorobenzidine was completely tetrazotized, approximately 60 minutes.

Modifications of tetrazotized 3,3'-dichlorobenzidine, prepared in the above-mentioned manner, were prepared by adding 3-5 mole percent of one of the following acetoacetarylides to the 3,3'-dichlorobenzidine tetrazo: AAPP (p-ethoxy-), AAPC (p-chloro-), AAMX (2,4-dimethyl-), AAPSA (p-sulfo-), AAPT (p-methyl), AAPACAA (p-acetoamido-), AAPA (p-methoxy), AAOC (o-chloro-), AAA (acetoacetanilide), AAOT (o-methyl), and AAOA (o-methoxy). The acetoacetarylides were added to the reactor vessel containing the 3,3'-dichlorobenzidine tetrazonium salt by adding 3-5 mole percent of the acetoacetarylides as 10% solutions in 80% acetic acid, allowing the arylide to couple out at low pH (1-2) at 0° C. for 20 to 30 minutes. This resulting modified 3,3'-dichlorobenzidine tetrazo was then coupled into a slight excess of the stoichiometric amount of a second acetoacetarylide slurry. The second acetoacetarylide slurry was prepared by mixing acetoacetanilide with water, sodium acetate and acetic acid. The modified 3,3'-dichlorobenzidine tetrazo was added to the acetoacetanilide slurry at 20° C. and the reaction was maintained at 20° C. for about 60 minutes until the modified tetrazo salt was completely coupled out. The diarylide yellow slurries were filtered by vacuum filtration and washed with tap water. The resulting presscakes were dried at room temperature. The resulting pigment compositions were then evaouated in linseed oil Hoover Mulls versus pigment compositions of conventional AAA diarylide yellow prepared under similar conditions. The pigments were dispersed in the linseed oil by mulling 50 revolutions for three cycles. As indicated in the following table, several of the acetoacetarylide modified AAA diarylide yellow pigment compositions gave significant increases in strength versus conventional AAA diarylide yellow pigment.

TABLE

| Acetoacetarylide Modified Pigment | % Color Strength Increase |
|---|---|
| AAPC (p-chloro-) | +22% |
| AAMX (2,4-dimethyl-) | +20% |
| AAPSA (p-sulfo-) | +15% |
| AAPT (p-methyl) | +15% |
| AAPACAA (p-acetoamido-) | +15% |
| AAPA (p-methoxy) | +10% |
| AAOC (o-chloro-) | +10% |
| AAA (acetoacetanilide)-control | +5% |
| AAOT (o-methyl) | +3% |
| AAOA (o-methoxy) | -3% |

EXAMPLE 2

A 570 g batch of AAA diarylide yellow pigment composition, made with five mole percent acetoacet-2,4-xylidide (AAMX) in accordance with the procedure of Example 1, was flushed in a rosin-modified resin/aliphatic ink oil vehicle to give a base that was 20% stronger, much more transparent, slightly redder and only slightly more viscous than that from a conventional AAA diarylide yellow pigment. The flushing vehicle was made from resins such as Betalite I-640 TM and Pentalyn G TM and from oils such as Magie 470 TM and Magiesol 52 TM. The flushed bases may contain optional ingredients such as antioxidants and fatty alcohols.

EXAMPLE 3

A yellow heatset offset printing ink was made from the flushed base of Example 2 by mixing with a slow-speed mixer the following ingredients:
30 parts of the flushed base of Example 2.
55 parts of a gelled rosin-modified phenolic resin/hydrocarbon resin/alkyd vehicle such as Lawter LoCal HGl TM or Varchem 785-33 TM.
3 parts bodied linseed oil.
1 part polyethylene wax
0.5 part antioxidant
10.5 parts aliphatic ink oil such as Magie 470 TM.

The ink was rolled out on coated paper stock with a conventional proofer. The ink containing the pigment of Example 2 was stronger and more transparent than a printing ink prepared in a similar manner containing a conventional diarylide yellow pigment.

The modified pigment compositions of the present invention demonstrate superior strength compared to conventional diarylide yellow pigments of the prior art. In addition, the process is improved in that the possible decomposition of the tetrazo at high pH (4.0) or contamination of the diarylide yellow pigment with a surfactant is eliminated. The dispersibility of the pigments of the present invention is high.

Although this invention has been shown and described with respect to detailed embodiments thereof, it will be understood by those skilled in the art that various changes in form and detail thereof may be made without departing from the spirit and scope of the claimed invention.

We claim:

1. A method of manufacturing diarylide yellow pigments comprising tetrazotizing 3,3'-dichlorobenzidine, then coupling the tetrazonium salt with an acetoacetarylide, and then filtering and washing the resulting pigment, wherein the improvement comprises:
    modifying the tetrazotized 3,3'-dichlorobenzidine by reacting with about 3 mole % to about 5 mole % of an acetic acid solution of a first acetoacetarylide; and
    then coupling the modified 3,3'-dichlorobenzidine tetrazonium salt into a slurry of a second acetoacetarylide,
thereby producing diarylide yellow pigment compositions having increased color strength over diarylide yellow compositions produced by conventional methods.

2. The method of claim 1 wherein the first acetoacetarylide is a member of the group consisting of
    acetoacet-p-phenetidide (AAPP),
    acetroacet-p-chloranilide (AAPC),
    acetoacet-2,4-xylidide (AAMX),
    acetoacet-p-sulfoanilide (AAPSA),
    acetoacet-p-anisidide (AAPA),
    acetoacet-o-chloroanilide (AAOC) and acetoacetanilide (AAA).

3. The method of claim 1 wherein the second acetoacetarylide is acetoacetanilide.

4. The method of claim 2 wherein the acetic acid solution of acetoacetarylide has a pH of about 1 to about 2.

5. A diarylide yellow pigment composition produced by the process of claims 1, 2, 3 or 4, wherein the diarylide yellow pigment composition has increased color strength over diarylide yellow pigment compositions produced by conventional methods.

6. A printing ink of the type consisting essentially of an aliphatic ink oil, rosin-modified resin, wax, antioxidant and diarylide yellow pigment, wherein the improvement comprises a diarylide yellow pigment produced by the process of claims 1, 2, 3 or 4, wherein the printing ink has increased color strength and transparency over printing inks manufactured from conventional diarylide yellow pigment compositions.

* * * * *

REEXAMINATION CERTIFICATE (1492nd)

United States Patent [19]

Hays et al.

[11] B1 4,648,907

[45] Certificate Issued Jun. 18, 1991

[54] HIGH COLOR STRENGTH DIARYLIDE YELLOW PIGMENT COMPOSITIONS

[75] Inventors: Byron G. Hays, Verona; Robert J. Stanaback, Gladstone, both of N.J.

[73] Assignee: BASF Corporation, Clifton, N.J.

Reexamination Request:
No. 90/002,054, Jun. 12, 1990

Reexamination Certificate for:
Patent No.: 4,648,907
Issued: Mar. 10, 1987
Appl. No.: 722,976
Filed: Apr. 12, 1985

[51] Int. Cl.$^5$ .............................................. C09D 11/08
[52] U.S. Cl. ...................................... 106/30; 106/31; 106/496; 534/747; 534/807
[58] Field of Search ................... 106/30, 31, 534, 747

[56] References Cited

U.S. PATENT DOCUMENTS

4,341,701  7/1982  Pechey et al.

FOREIGN PATENT DOCUMENTS

1111050  4/1968  United Kingdom.
1375152  11/1974  United Kingdom.

*Primary Examiner*—Amelia B. Yarbrough

[57] ABSTRACT

Improved diarylide yellow pigment compositions having high color strength. The compositions are manufactured by modifying tetrazotized 3,3'-dichlorobenzidine with a solution of about 3 to about 5 mole percent of a first acetoacetarylide, followed by coupling into a second acetoacetarylide such as acetoacetanilide.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–6 are cancelled.

* * * * *

REEXAMINATION CERTIFICATE (1832nd)

United States Patent [19]

Hays et al.

[11] B1 4,648,907

[45] Certificate Issued  Nov. 3, 1992

[54] HIGH COLOR STRENGTH DIARYLIDE YELLOW PIGMENT COMPOSITIONS

[75] Inventors: Byron G. Hays, Verona; Robert J. Stanaback, Gladstone, both of N.J.

[73] Assignee: BASF Corporation, Clifton, N.J.

Reexamination Request:
No. 90/002,054, Jun. 12, 1990

Reexamination Certificate for:
Patent No.: 4,648,907
Issued: Mar. 10, 1987
Appl. No.: 722,976
Filed: Apr. 12, 1985

[51] Int. Cl.$^5$ ............................................. C09D 11/08
[52] U.S. Cl. .................................. 106/30; 106/31; 106/496; 534/747; 534/807
[58] Field of Search .................. 106/30, 31, 534, 747

[56] References Cited

U.S. PATENT DOCUMENTS

4,341,701  7/1982  Pechey et al.

FOREIGN PATENT DOCUMENTS

1111050  4/1968  United Kingdom.
1375152  11/1974  United Kingdom.

*Primary Examiner*—Amelia Burgess Yarbrough

[57] ABSTRACT

Improved diarylide yellow pigment compositions having high color strength. The compositions are manufactured by modifying tetrazotized 3,3'-dichlorobenzidine with a solution of about 3 to about 5 mole percent of a first acetoacetarylide, followed by coupling into a second acetoacetarylide such as acetoacetanilide.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-6 are cancelled.

* * * * *